(12) United States Patent
Jha et al.

(10) Patent No.: US 12,142,037 B2
(45) Date of Patent: *Nov. 12, 2024

(54) SYSTEMS AND METHODS FOR IDENTIFYING A SERVICE QUALIFICATION OF A MULTI-UNIT BUILDING BASED ON EXTERIOR ACCESS

(71) Applicant: Verizon Patent and Licensing Inc., Basking Ridge, NJ (US)

(72) Inventors: Vipul Jha, Plano, TX (US); Sheikbharith Liakathali, Irving, TX (US); Rajat Sharma, Southlake, TX (US); Senthil Muthusamy, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 364 days.

This patent is subject to a terminal disclaimer.

(21) Appl. No.: 17/660,218

(22) Filed: Apr. 22, 2022

(65) Prior Publication Data
US 2022/0245939 A1   Aug. 4, 2022

Related U.S. Application Data

(63) Continuation of application No. 16/947,038, filed on Jul. 15, 2020, now Pat. No. 11,321,940.

(51) Int. Cl.
G06T 7/00   (2017.01)
G06T 7/50   (2017.01)
G06T 7/70   (2017.01)
G06V 20/10  (2022.01)

(52) U.S. Cl.
CPC .............. *G06V 20/176* (2022.01); *G06T 7/50* (2017.01); *G06T 7/70* (2017.01); *G06T 2207/20081* (2013.01); *G06T 2207/30184* (2013.01)

(58) Field of Classification Search
CPC ........... G06V 20/176; G06T 7/50; G06T 7/70; G06T 2207/20081; G06T 2207/30184; G06T 2207/20084; G06T 7/73
See application file for complete search history.

(56) References Cited

U.S. PATENT DOCUMENTS

| | | |
|---|---|---|
| 11,131,597 B1 * | 9/2021 | Oakes, III ............... G06T 17/00 |
| 2017/0116707 A1 * | 4/2017 | Upendran ............. G06F 16/583 |
| 2019/0019324 A1 * | 1/2019 | Wu ......................... G06T 19/20 |
| 2020/0334901 A1 * | 10/2020 | Upendran .............. G06T 15/04 |
| 2021/0097454 A1 * | 4/2021 | Stebbins ................... G06T 7/70 |
| 2021/0199457 A1 | 7/2021 | Shukla et al. |
| 2021/0312657 A1 | 10/2021 | Monir et al. |
| 2021/0374456 A1 | 12/2021 | Umakanth et al. |

* cited by examiner

*Primary Examiner* — Ping Y Hsieh

(57) ABSTRACT

A device may receive building location information associated with a multi-unit building. The device may obtain an image that depicts the multi-unit building. The device may process, using a building analysis model, the image to identify exterior access features of the multi-unit building. The building analysis model may be trained based on a plurality of historical images of other exterior access features. The device may determine, using a scoring system and based on a configuration of exterior access features that are identified by the building analysis model, an exterior accessibility score of the unit. The device may perform, based on the exterior accessibility score, an action associated with qualifying the unit for installation of a service that involves access, from the unit, to an exterior of the multi-unit building.

20 Claims, 8 Drawing Sheets

SYSTEMS AND METHODS FOR IDENTIFYING A SERVICE QUALIFICATION OF A MULTI-UNIT BUILDING BASED ON EXTERIOR ACCESS

RELATED APPLICATION

This application is a continuation of U.S. patent application Ser. No. 16/947,038, entitled "SYSTEMS AND METHODS FOR IDENTIFYING A SERVICE QUALIFICATION OF A MULTI-UNIT BUILDING BASED ON EXTERIOR ACCESS," filed Jul. 15, 2020 (now U.S. Pat. No. 11,321,940), which is incorporated herein by reference in its entirety.

BACKGROUND

A network service (e.g., Internet access) may be provided via a wireless network (e.g., a fifth generation (5G) wireless network) to a customer residing in a home, to multiple customers residing in units (e.g., apartments, condominiums, and/or the like) of a community, and/or the like.

DETAILED DESCRIPTION OF PREFERRED EMBODIMENTS

Figure 1A:
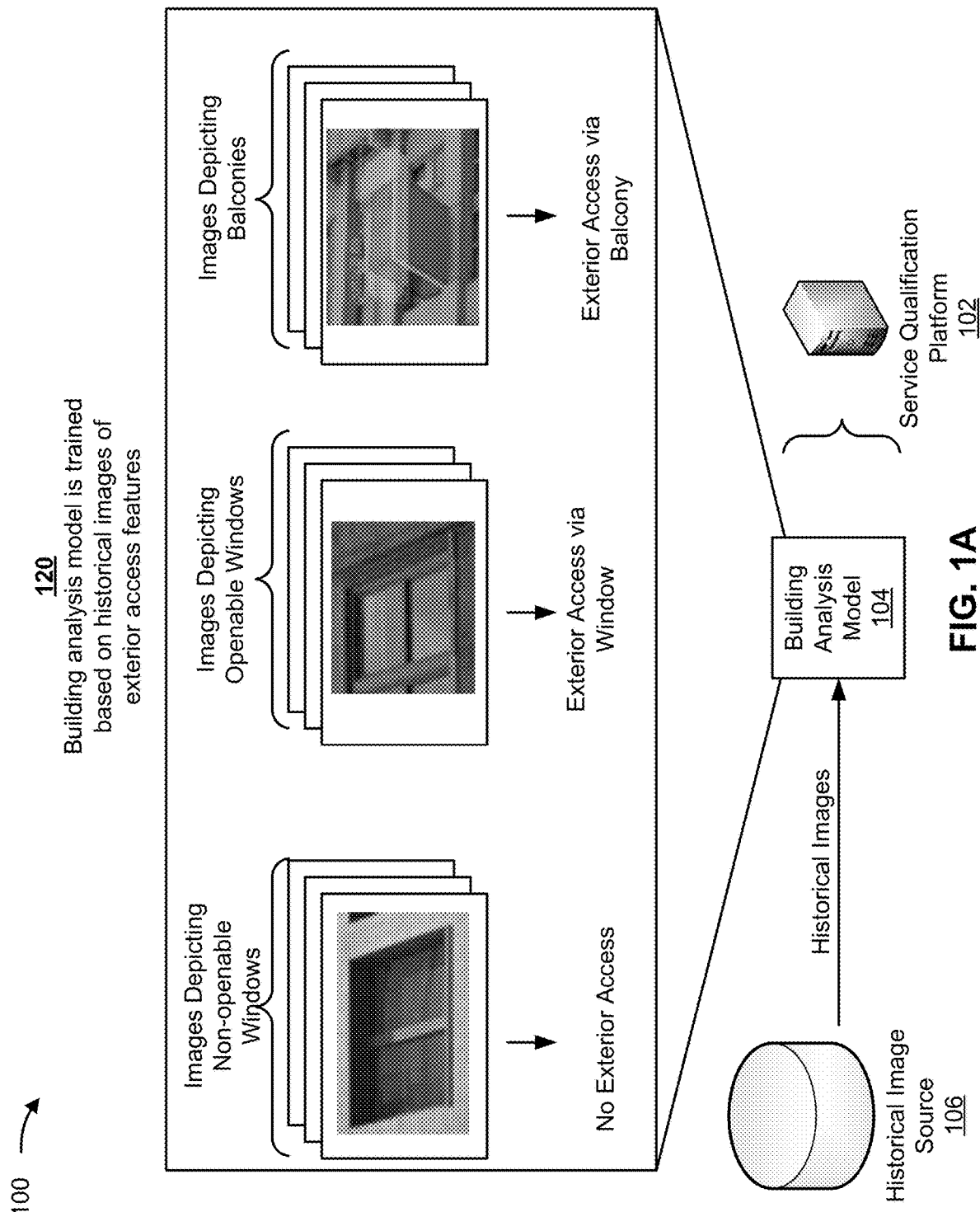
FIGS. 1A-1D are diagrams of one or more example implementations described herein.

The following detailed description of example implementations refers to the accompanying drawings. The same reference numbers in different drawings may identify the same or similar elements.

5G home Internet service is a 5G wireless network service that connects a home of a customer with ultra-wide band Internet. Coverage of the 5G wireless network service is an important factor for providing a quality network service, such as ultra-fast Internet to the consumer. Currently, if a customer who lives in a unit of a building (e.g., an apartment unit, a condominium unit, a townhome, and/or the like of the building) desires 5G wireless network service, the customer provides, to a network provider of the 5G wireless network service, a street address of the building. The network provider qualifies the unit for the 5G wireless network service based on a general availability of the 5G wireless network service at the street address.

However, this general availability does not necessary mean that a unit will receive good coverage for the 5G wireless network service, or coverage at all due to a location of the unit within the building, and the nature of directional communications for the 5G wireless network service. For example, the unit may not have a line of sight to a base station in the geographic vicinity of the building, may not have access to an exterior of the building to accommodate installation of equipment for the 5G wireless network service, and/or the like. For instance, the unit may not have a window facing a street, may not have a window capable of being opened to receive equipment of the 5G wireless network service, may not have a balcony capable of accommodating installation of equipment for receiving the 5G wireless network service, and/or the like. Accordingly, this general availability results in false positives (e.g., indicating network coverage when network coverage is either not available or not an acceptable quality) for network service qualifications.

Thus, current techniques waste computing resources (e.g., processing resources, memory resources, communication resources, and/or the like), networking resources, and/or the like by incorrectly qualifying wireless network coverage for a network service, correcting the wireless network coverage for the network service, handling customer complaints associated with the network service, and/or the like.

Some implementations described herein provide a service qualification platform that qualifies a unit of a multi-unit building to receive a wireless network service (e.g., 5G wireless network service). For example, the service qualification platform may receive building location information associated with a multi-unit building; obtain an image that depicts the multi-unit building; and process, using a building analysis model, the image to identify exterior access features of the multi-unit building (e.g., openable windows, balconies, patios, and/or the like). The building analysis model may be trained based on a plurality of historical images of other exterior access features. The device may determine, using a scoring system and based on a configuration of exterior access features that are identified by the building analysis model, an exterior accessibility score of the unit; and perform, based on the exterior accessibility score, an action associated with qualifying the unit for installation of a wireless network service (e.g., 5G wireless network service) that involves access, from the unit, to an exterior of the multi-unit building.

By using the building analysis model, the service qualification platform may identify a unit with exterior access to a multi-unit building (e.g., a unit that is a good candidate for 5G wireless network service) and a unit with no exterior access to the multi-unit building (e.g., a unit that is a poor candidate for 5G wireless network service). By identifying a unit with no exterior access, the service qualification platform may eliminate false positives (e.g., indicating 5G wireless network coverage) for network service qualifications for such unit that would occur when simply qualifying every unit of the multi-unit building based on the address of the multi-unit building. By eliminating false positives, the service qualification platform may preserve computing resources (e.g., processing resources, memory resources, communication resources, and/or the like), networking resources, and/or or the like that would have been used to configure network services in a unit to which 5G wireless network services cannot be provided, attempt to correct the wireless network coverage for the unit to which 5G wireless network services cannot be provided, handle customer complaints associated with 5G wireless network services, and/or the like. By eliminating false positives, the service qualification platform may enhance customer experience associated with the network service at the unit.

While the description provided herein discusses 5G wireless network service, the techniques described herein are equally applicable to other types of wireless network service, such as 4G, WiFi, and/or the like.

FIGS. 1A-1D are diagrams of one or more example implementations 100 described herein. As shown in FIG.

1A, a service qualification platform 102 may be associated with a building analysis model 104, a historical image source 106, a user device 108, and a geographical information system 110. Service qualification platform 102 may include a system or platform that utilizes a machine learning model (e.g., building analysis model 104) to identify a service qualification of units of a multi-unit building based on exterior access of the units of the multi-unit building. Building analysis model 104 may include one or more machine learning models that are trained using historical images of multi-unit buildings (e.g., apartment buildings, condominium buildings, a row of townhouses, a row of rowhouses, and/or the like) to determine exterior accessibility information of units of the multi-unit buildings (e.g., to determine exterior access of the units of the multi-unit buildings). In some implementations, building analysis model 104 may be included in service qualification platform 102.

Historical image source 106 may include a data structure (e.g., a database, a linked list, a table, and/or the like) that stores historical images of multi-unit buildings. The historical images may include images that depict street views of the multi-buildings. User device 108 may be associated with a user (e.g., a technician, a customer, a resident, and/or the like) and may include a mobile phone (e.g., a smart phone), a laptop computer, a tablet computer, a desktop computer, and/or the like that the user may utilize to provide information to and/or receive information from service qualification platform 102. Geographical information system 110 includes one or more devices that provide images (e.g., images that depict street views) of multi-unit buildings based on a geographical address. The images may also include aerial images obtained from one or more satellites (e.g., satellite imagery).

As shown in FIG. 1A, and by reference number 120, the building analysis model 104 may be trained based on historical images of exterior access features of multi-unit buildings. In some implementations, the historical images may depict street views of facades of the multi-unit buildings. The term facade may be used to refer to a portion of a building or multi-unit building that faces a street. The facade may identify the exterior access features such as, for example, balconies and different types of windows. As shown in FIG. 1A, the historical images may include images that depict non-openable windows, images that depict openable windows, images that depict balconies, and/or the like.

As shown in FIG. 1A, the historical images may be obtained from historical image source 106. The historical images, from historical image source 106, may correspond to images of multiple multi-unit buildings. In some implementations, the historical images, from historical image source 106, may be obtained from one or more providers of satellite imagery (e.g., geographical information system 110), as explained below.

In some implementations, building analysis model 104 may perform object detection on the historical images. For example, the building analysis model may include a computer vision model that is configured to identify individual exterior access features of a multi-unit building based on detecting a particular shape depicted in the image that corresponds to an openable window (e.g., a hung window), a particular shape depicted in the image that corresponds to an un-openable window (e.g., a fixed window), detecting a particular shape depicted in the image that corresponds to a balcony, detecting a particular shape depicted in the image that corresponds to a patio, and/or the like. In some implementations, the computer vision model may be trained based on a Common Objects in Context (COCO) dataset.

As result of the object detection, the historical images may be annotated with data that includes information identifying exterior access features detected in the historical images. For example, the information identifying exterior access features may include a quantity of the exterior access features, information identifying types of the exterior access features (e.g., openable window, un-openable window, balcony, and/or the like), location of the exterior access features (e.g., pixel coordinates of the exterior access features), a measure of confidence (e.g., a confidence score) of the detection of the exterior access features, and/or the like. In some implementations, the annotated data may be stored in a file (e.g. a JavaScript Object Notation (JSON) file).

In some implementations, as a result of the object detection, building analysis model 104 may determine one or more bounding box coordinates for the exterior access features (e.g., based on the location of the exterior access features) and may provide the historical images with annotated bounding boxes identifying the exterior features (e.g., a bounding box for a balcony, a bounding box for different types of windows, a bounding box for a patio, and/or the like). In some implementations, a measure of confidence of the object detection may be dynamically determined based on one or more factors such as, for example, automatic identification of a quality of an image, lighting conditions of the image, obstructions in the image, information regarding a customer base associated with the image (e.g., associated with a geographical area), and/or the like.

In some implementations, service qualification platform 102 may train building analysis model 104 with the historical images and the annotated data to identify exterior access features of a multi-unit building and determine whether the exterior access features provide exterior accessibility. For example, as shown in FIG. 1A, building analysis model 104 may identify non-openable windows, openable windows, and balconies and may determine that non-openable windows provide no exterior access, openable windows provide exterior access (e.g., via the windows), and balconies provide exterior access (e.g., via the balconies). In some implementations, service qualification platform 102 may train building analysis model 104 to analyze the historical images to identify bounding boxes for the exterior access features and, accordingly, identify the exterior access features in the images using the bounding boxes.

Service qualification platform 102 may train building analysis model 104 in a manner similar to the manner described below in connection with FIG. 2. Alternatively, rather than training building analysis model 104, service qualification platform 102 may obtain the machine learning model from another system or device that trained the machine learning model. In this case, the other system or device may obtain the historical data (e.g., the historical data discussed above) for use in training building analysis model 104, and may periodically receive additional data that the other system or device may use to retrain or update building analysis model 104. In some implementations, service qualification platform 102 may periodically obtain additional data (e.g., additional images of multi-unit buildings, user feedback regarding the additional images, and/or the like) that service qualification platform 102 may use to retrain or update building analysis model 104, as described below.

In some implementations, building analysis model 104 may include a deep neural network (e.g., recurrent convolutional neural network (RCNN) model) and may use one or more deep neural network algorithms (e.g., a Mask RCNN algorithm) to identify the exterior access features and determine whether the exterior access features provide exterior access. Building analysis model 104 may be trained based on a configuration of the exterior access features such as, for example, a quantity of the exterior access features on the facades, types of the exterior access features (e.g., balcony, patio, window, type of window, and/or the like), a portion (e.g., percentage) of a surface area of facades that is associated with the identified exterior access features, information identifying locations of the exterior access features within the historical images, and/or the like.

When processing an image of a multi-unit building, service qualification platform 102 may apply building analysis model 104 to a new observation in a manner similar to the manner described below in connection with FIG. 2. For example, service qualification platform 102, using building analysis model 104, may analyze the image and may identify exterior access features of the multi-unit building based on the analysis. For instance, building analysis model 104 may identify (e.g., highlight) the exterior access features of the multi-unit building (e.g., highlight the exterior access features using bounding boxes). In some implementations, building analysis model 104 may group (or consolidated) identified exterior access features (e.g., window types and balconies) based on measures of confidence (e.g., confidence scores) associated with detecting (or identifying) the exterior access features. As shown in FIG. 1A, building analysis model 104 may identify non-openable windows, openable windows, and balconies, may highlight one or more of the non-openable windows, openable windows, and balconies, and may determine that non-openable windows provide no exterior access, openable windows provide exterior access (e.g., via the windows), and balconies provide exterior access (e.g., via the balconies). In some implementations, building analysis model 104 may determine a measure of confidence for exterior accessibility (e.g., a confidence score for exterior accessibility) for the exterior access features. The measure of confidence for exterior accessibility of an exterior access feature may correspond to a probability that the exterior access feature enables access to an exterior of the multi-unit building.

By training building analysis model 104 to identify exterior access features and determine whether the exterior access features provide exterior access, service qualification platform 102 may eliminate false positives (e.g., indicating 5G wireless network coverage) for network service qualifications for a unit that would occur when simply qualifying every unit of the multi-unit building (e.g., based on the address of the multi-unit building).

Figure 1B:
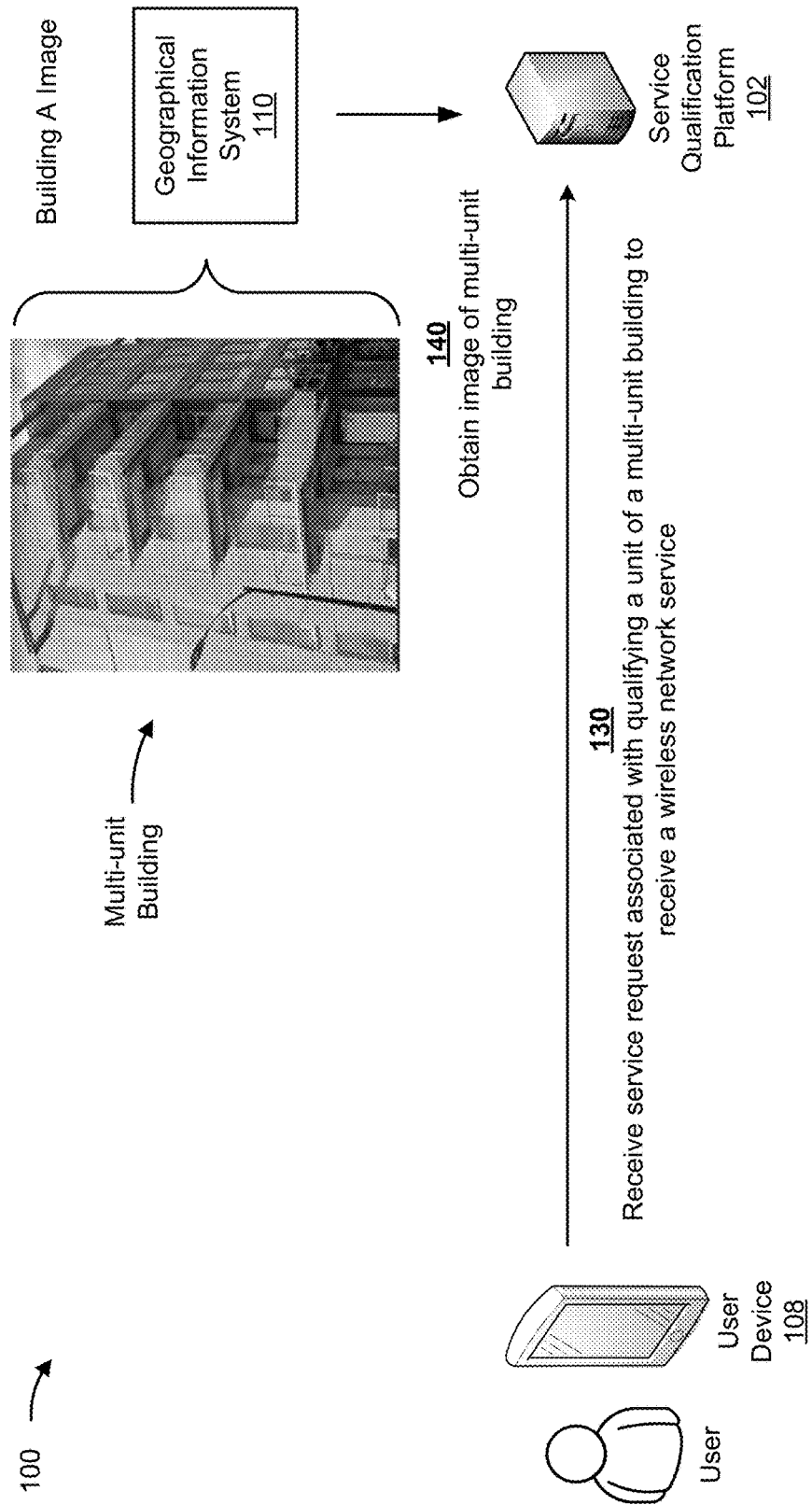

As shown in FIG. 1B, and by reference number 130, service qualification platform 102 may receive a service request associated with qualifying a unit of a multi-unit building to receive a wireless network service (e.g., 5G wireless network service). For example, service qualification platform 102 may receive the service request from user device 108 via an application associated with qualifying a unit of the multi-unit building to receive the wireless network service. In some implementations, service qualification platform 102 may provide, to user device 108, the application, as described herein.

In some implementations, the user may utilize user device 108 to download the application from service qualification platform 102 or another source, and to install the application. Once user device 108 installs the application, the user may utilize user device 108 to set up the application. For example, the application may request that the user provide credentials (e.g., a user name, a password, an employee identifier, and/or the like) for accessing the application. In some implementations, the application may enable user device 108 to determine service qualification for one or more units of a multi-unit building, as described herein.

After setting up the application, user device 108 may transmit the service request (e.g., a service request) to service qualification platform 102 using the application. The service request may include building location information of the multi-unit building. The building location information may include an address of the multi-unit building, a street associated with the multi-unit building, geographical coordinates of the multi-unit building (e.g., longitude and/or latitude coordinates), an identification of the unit (e.g., alphanumeric character), information identifying a floor (of the multi-building) that includes the unit, and/or the like.

As shown in FIG. 1B, and by reference number 140, service qualification platform 102 may obtain an image of the multi-unit building. For example, service qualification platform 102 may use a geographical information system 110 to obtain the image of the multi-unit building, based on the building location information included in the service request. For example, service qualification platform 102 may establish a communication session with geographical information system 110 and transmit a request (e.g., a message including the building location information) for any images of the multi-unit building accessible by geographical information system 110. Geographical information system 110 may receive the request for images and may send, in response to such request, the images of the multi-unit building.

The images may depict street views of the multi-unit building from a geographical location that is mapped to the building location information by geographical information system 110. For example, the images may be images that depict street views of the multi-unit building from the geographical location identified in the building location information (e.g., street views from streets surrounding the multi-unit building). The images may depict one or more facades of the multi-unit building (e.g., a portion of a building that faces a street associated with the street view).

In some implementations, service qualification platform 102 may obtain a layout of the multi-unit building from a building layout data structure. The building layout data structure may store layouts of different multi-unit buildings. For example, the building layout data structure may store information identifying a floor of a multi-unit building in association with information identifying a location of such multi-unit building and the floor of such multi-unit building. As an example, service qualification platform 102 may obtain the layout of one or more floors of the multi-unit building from the building layout data structure based on the building location information of the multi-unit building. The one or more layouts may identify locations of each unit of the one or more floors of the multi-unit building.

Service qualification platform 102 may analyze the one or more layouts and identify a location of the unit (e.g., a floor of the multi-unit and/or a location on the floor) based on the unit identification and/or the information identifying the floor included in the building location information. Service qualification platform 102 may provide information identifying the location of the unit to geographical information system 110 to enable geographical information system 110 to obtain an image that depicts a facade (of the multi-unit building) that includes the unit. Alternatively, service qualification platform 102 may obtain the images (e.g., that depict street views of the multi-unit building) from geographical information system 110 and identify an image (from the images) corresponding to the location of the unit to analyze.

In some implementations, prior to using geographical information system 110 to obtain the image, service qualification platform 102 may determine, based on unit location information associated with the unit, that the facade is associated with the unit. The unit location information may be obtained by the user and may be transmitted with the service request. For example, the user, using user device 108 and the application, may indicate (as the unit location information) a side of the multi-unit building and/or a street that the unit faces, an address of the unit, a street associated with the unit, geographical coordinates of the unit (e.g., longitude and/or latitude coordinates), and/or the like. For instance, the user may provide such indication via an image that depicts a street view of the multi-unit building.

Based on such indication (e.g., of the unit location information), service qualification platform 102 may determine that the facade includes a portion of the unit (e.g., a window of the unit, a balcony of the unit, and/or the like). Accordingly, service qualification platform 102 may cause geographical information system 110 to obtain the image that depicts the facade of the multi-unit building based on determining that the facade is associated with the unit. In some implementations, the building location information may include the unit location information.

In some implementations, if geographical information system 110 is unable to obtain an image of the facade (of the multi-unit building) that includes a portion of the unit (e.g., based on the building location information and/or the unit location information), geographical information system 110 may obtain an image of another facade (of the multi-unit building) that does not include a portion of the unit. Service qualification platform 102 may analyze the image to identify exterior access features of the other facade and determine exterior access features of the facade that includes the unit based on the exterior access features of the other facade (e.g. based on a type of the exterior access features on the other facade, the location of the exterior access features on the other facade, a quantity of the exterior access features on the other facade, an arrangement of the exterior access features on the other facade, and/or the like). In some implementations, if geographical information system 110 is unable to obtain an image depicting a street view of the facade of the multi-unit building, geographical information system 110 may obtain satellite images of the facade of the multi-unit building.

In some implementations, if geographical information system 110 is unable to obtain any image of the multi-unit building, geographical information system 110 may transmit a notification to service qualification platform 102 indicating that geographical information system 110 is unable to obtain any image of the multi-unit building. Based on the notification, service qualification platform 102 may transmit a request to user device 108 for information identifying a location of the unit (e.g., information indicating whether the unit is located on a facade of the multi-unit building, information identifying a floor of the multi-unit building that includes the unit, information identifying exterior access features of the unit (e.g., a type, a quantity, an arrangement, and/or the like), and/or the like). Additionally, or alternatively, service qualification platform 102 may transmit a request to an autonomous machine (e.g., unmanned aerial vehicle, autonomous vehicle, and/or the like) associated with service qualification platform 102 to obtain images depicting street views of the facade (of the multi-unit building) that includes the unit.

Figure 1C:
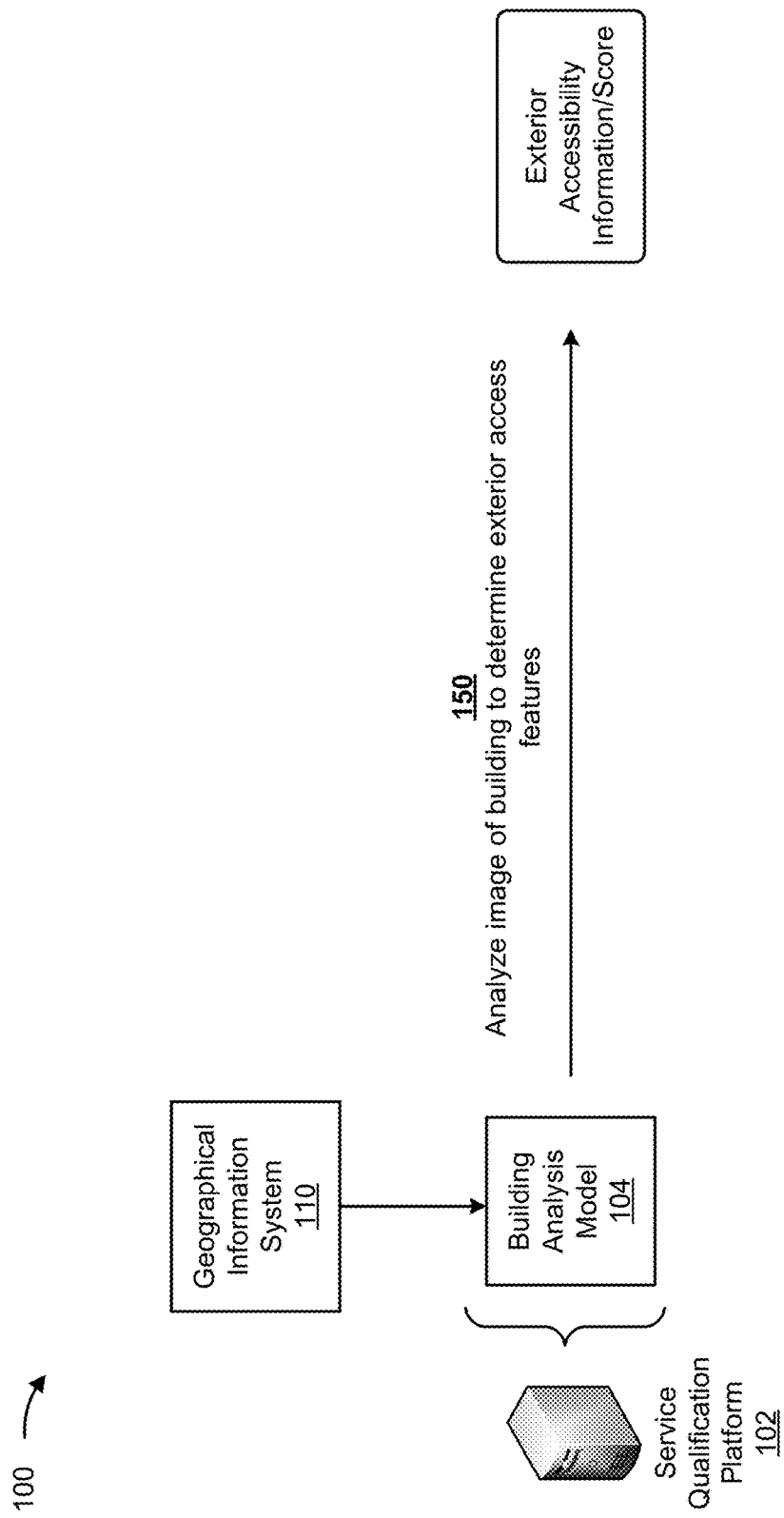

As shown in FIG. 1C, and by reference number 150, service qualification platform 102 may analyze the image(s) of the multi-unit building to determine exterior access features. In some implementations, the image(s) of the multi-unit building may correspond to images of an entirety (or a majority) of the multi-unit building. Accordingly, service qualification platform 102 may analyze the image(s) of the multi-unit building to determine exterior access features of the entirety of the multi-unit building (e.g., every floor, every facade, every unit, and/or the like). Service qualification platform 102 may store a result of such analysis in an exterior access features data structure associated with service qualification platform 102. For example, information identifying a floor may be stored in association with information identifying the exterior access features of the floor, information identifying a facade may be stored in association with information identifying the exterior access features of the facade, information identifying a unit may be stored in association with information identifying the exterior access features of the unit, and/or the like.

In some implementations, the image(s) of the multi-unit building may correspond to images of the facade (of the multi-unit building) that includes the unit. Accordingly, service qualification platform 102 may analyze the image(s) of the multi-unit building to determine exterior access features of a portion of the facade that includes the unit or an entirety of the facade. Service qualification platform 102 may store a result of such analysis in the exterior access features data structure associated with service qualification platform 102. For example, information identifying the unit may be stored, in a data structure, in association with information identifying the exterior access features of the unit. Alternatively, information identifying each unit of the facade may be stored, in a data structure, in association with information identifying the exterior access features of such unit.

In some implementations, instead of analyzing the image(s) of the multi-unit, service qualification platform 102 may search the exterior access features in the data structure, using information identifying the unit, to obtain information identifying the exterior access features of the unit (e.g., if the images of the facade (that includes the unit) have been previously analyzed).

When analyzing the image(s) of the multi-unit building, service qualification platform 102 may process, using building analysis model 104, the image to identify the exterior access features of the multi-unit building (including any exterior access features of the unit). The exterior access features may include one or more balconies, windows, other structures providing an access to an exterior of the multi-unit building, and/or the like. Service qualification platform 102 may provide the image(s) to building analysis model 104 as an input. In some implementations, building analysis model 104 may analyze the image(s) to identify bounding boxes for the exterior access features within the image(s). For example, building analysis model 104 may utilize an object detection algorithm (e.g., a you-only-look-once (YOLO) algorithm, a single shot multibox detector (SSD) algorithm, and/or the like) to analyze the image to identify bounding boxes for the exterior access features within the image.

In some implementations, service qualification platform 102 may determine, based on a configuration of the exterior access features that are identified by building analysis model 104, a measure of exterior accessibility of the unit (e.g., an exterior accessibility score of the unit). The exterior accessibility score corresponds to a degree of access, from the unit, to an exterior of the multi-unit building. The degree of access may be based on quantity of access points, types of access points (e.g., a balcony may have a greater degree of access than an openable window), and/or the like. The exterior accessibility score may correspond to a probability that the unit enables access (e.g., to the user) to an exterior of the multi-unit building.

The configuration of the identified exterior access features may be associated with a quantity of the exterior access features on the facade of the multi-unit building, types of the identified exterior access features identified on the facade of the multi-unit building, a portion (e.g., a percentage) of a surface area of the facade that is associated with the exterior access features, and/or the like. As an example, the higher the portion of the facade that includes an openable window or balcony, the more likely that the unit is going to have exterior access.

For example, the measure of confidence for exterior accessibility of an exterior access feature may correspond to a probability that the exterior access feature enables access to an exterior of the multi-unit building. In some implementations, the exterior accessibility score may be determined using a scoring system. The scoring system may be configured to determine a first probability that a unit of the multi-unit building has access to an exterior of the multi-unit building via an openable window; determine a second probability that the unit of the multi-unit building has access to the exterior of the multi-unit building via a balcony; and determine the exterior accessibility score based on first probability and the second probability (e.g., a weighted average as explained below).

For example, service qualification platform 102 may determine the measure of exterior accessibility of the unit based on a combination of the measures of confidence for exterior accessibility discussed above. In some implementations, a weight of the measure of confidence for exterior accessibility of one exterior access feature may be different than a weight of the measure of confidence for exterior accessibility of another exterior feature access. For example, a weight of the measure of confidence for exterior accessibility of a balcony may exceed a weight of the measure of confidence for exterior accessibility of a window (e.g., because a balcony may be easier to detect than detecting an openable window or an unopenable window).

In some implementations, service qualification platform 102 may receive validation information associated with the exterior accessibility score. For example, the validation information may be received from user device 108 (e.g., via the application). The validation information may indicate whether building analysis model 104 accurately detected the exterior access features (e.g., one or more balconies, openable windows, and/or non-openable windows) and/or whether the exterior accessibility score accurately depicts a measure of access to an exterior of the multi-unit building (e.g., from the unit). Service qualification platform 102 may cause building analysis model 104 to be retrained based on the image, the exterior accessibility score, and the validation information.

In some implementations, service qualification platform 102 may generate exterior accessibility information that includes information identifying the exterior access features within the image, the measure of exterior accessibility of the unit (e.g., the exterior accessibility score of the unit), and/or the like.

Figure 1D:
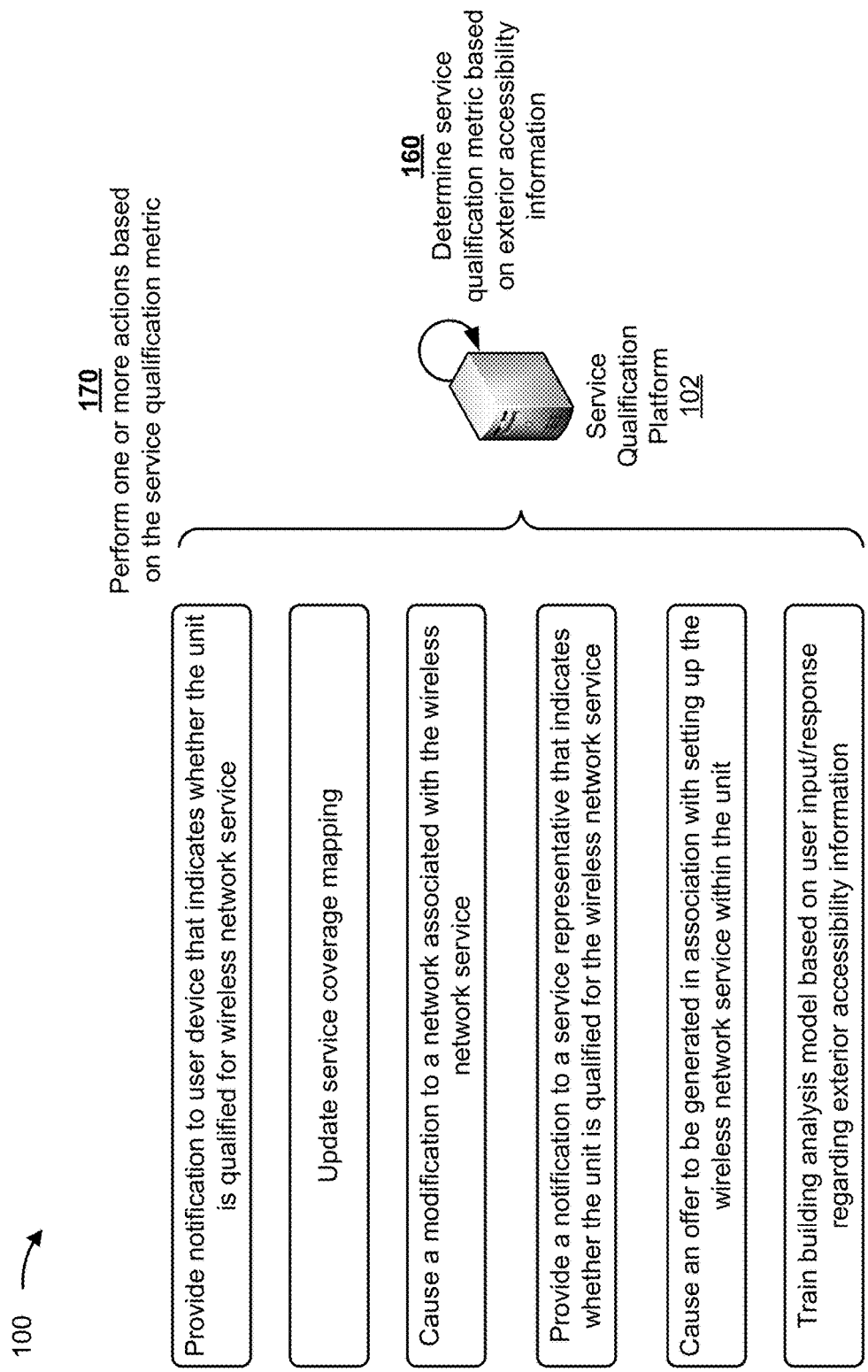

As shown in FIG. 1D, and by reference number 160, service qualification platform 102 may determine a service qualification metric based on the exterior accessibility information. For example, service qualification platform 102 may determine, based on the exterior accessibility score, the service qualification metric for the unit. The service qualification metric may include a value associated with a capability of receiving the service within the unit (e.g., based on the exterior accessibility information). For example, when an exterior accessibility score, for a unit, satisfies a threshold, the service qualification metric may indicate that the unit is capable of receiving the wireless network service. Similarly, when an exterior accessibility score, for a unit, fails to satisfy the threshold, the service qualification metric may indicate that the unit is incapable of receiving the wireless network service.

In some implementations, service qualification platform 102 may determine the service qualification metric based on the exterior accessibility score and a service coverage metric. The service coverage metric may include a value associated with an availability of the wireless network service at a geographical location associated with the building location information. For example, a service coverage metric indicating the service is available at the geographical location associated with the building location information may increase the service qualification metric.

Alternatively, the service coverage metric may include a value that indicates a predicted signal quality of the wireless network service at the multi-unit building. The exterior accessibility score may affect the predicted signal quality and, accordingly, affect the service qualification metric. For example, if the predicted signal quality barely satisfies a signal quality threshold (e.g., satisfies the signal quality threshold by a threshold amount), a service qualification metric of a unit with a balcony may satisfy a threshold indicating a capability of receiving the wireless network service. Conversely, a service qualification metric of a unit with an openable window (and no balcony) may not satisfy the threshold indicating the capability of receiving the wireless network service (e.g., because the balcony provides more exterior access than the openable window).

As another example, if the predicted signal quality barely meets a signal quality threshold, a service qualification metric of a unit on a higher floor of a facade of a multi-unit building may satisfy the threshold indicating the capability of receiving the wireless network service. Conversely, a service qualification metric of a unit on a lower floor of a multi-unit building may not satisfy the threshold indicating the capability of receiving the wireless network service.

As shown in FIG. 1D, and by reference number 170, service qualification platform 102 may perform one or more actions based on the service qualification metric. In some implementations, the one or more actions may include service qualification platform 102 providing a notification to user device 108 that indicates whether the unit is qualified for wireless network service (e.g., 5G wireless network service). For example, service qualification platform 102 may determine whether the service qualification metric satisfies a service threshold that indicates whether a unit is qualified for the wireless network service. For instance, service qualification platform 102 may qualify the unit for the wireless network service (e.g., by updating one or more records to indicate that the unit has been qualified) based on the service qualification metric indicating that the unit is capable of receiving the service (e.g., when the service qualification metric satisfies the service threshold).

Service qualification platform 102 may therefore provide, to user device 108, a notification indicating that the unit is qualified for the wireless network service. As another example, service qualification platform 102 may determine that the service qualification metric indicates that the unit is not capable of receiving the wireless network service (e.g., when the service qualification metric does not satisfy the threshold for providing the service) and may provide a notification, to user device 108, indicating that the unit is not qualified for the wireless network service.

In some implementations, the one or more actions may include service qualification platform 102 updating a service coverage mapping. For example, service qualification platform 102 may determine whether the service qualification metric satisfies the service threshold. If service qualification platform 102 determines that the service qualification metric satisfies the service threshold, service qualification platform 102 may update the service coverage mapping (associated with the service) to include the unit location information, the building location information, the geographical location associated with the building location information, and/or the like. In some implementations, service qualification platform 102 may store the building location information, the geographical location associated with the building location information, and/or the like in the exterior features data structure. For example, the building location information, the geographical location associated with the building location information, and/or the like may be stored in association with the information identifying the unit and the information identifying the exterior access features of the unit.

In some implementations, the one or more actions may include service qualification platform 102 causing a modification to a network associated with the wireless network service. For example, when the service qualification metric does not satisfy the threshold for providing the service, service qualification platform 102 may cause a modification to a network configured to provide the wireless network service (e.g., to cause network coverage to reach a perimeter location of the multi-unit building that is nearest to the unit). For example, service qualification platform 102 may increase signal strength associated with the wireless network service, increase a signal power associated with the wireless network service, modify a direction of a beam associated with the wireless network service, and/or the like.

In some implementations, the one or more actions may include service qualification platform 102 providing a notification to a service representative that indicates whether the unit is qualified for the wireless network service. For example, service qualification platform 102 may provide, to a user device of the service representative, a notification indicating that the unit is qualified for the wireless network service, to allow the service representative to communicate with the user of user device 108 to sign up for the wireless network service. As another example, service qualification platform 102 may provide, to the user device of the service representative, a notification indicating that the unit is not qualified for the service, to allow the wireless network service representative to communicate with the user of user device 108 to sign up for a different wireless network service (e.g., establishment of a local area network via a wired network).

In some implementations, the one or more actions may include service qualification platform 102 causing an offer to be generated in association with setting up the wireless network service within the unit. For example, service qualification platform 102 may determine whether the service qualification metric satisfies the service threshold. If service qualification platform 102 determines that the service qualification metric satisfies the service threshold, service qualification platform 102 may cause the offer to be generated in association with setting up the service within the unit. In some implementations, service qualification platform 102 may determine the offer based on a type of an exterior access feature associated with the unit.

For example, an offer associated with installation of the wireless network service on a balcony may be more economical and cheaper than an offer associated with installation of the wireless network service via a window (e.g., because the balcony provides more exterior access to a multi-unit building than an exterior access provided by the window). In some implementations, the offer may be prioritized based on a type of an exterior access feature associated with the unit. For example, an offer associated with installation of the wireless network service on a balcony may be prioritized over an offer associated with installation of the wireless network service via a window (e.g., because the balcony provides more exterior access to a multi-unit building than an exterior access provided by the window).

In some implementations, the one or more actions may include service qualification platform 102 training building analysis model 104 based on user input/response regarding exterior accessibility information. For example, validation information may be received from user device 108. The validation information may indicate whether building analysis model 104 accurately detected the exterior access features (e.g., one or more balconies, openable windows, and/or non-openable windows) and/or whether the exterior accessibility score accurately depicts a measure of access to an exterior of the multi-unit building (e.g., from the unit). Service qualification platform 102 may cause building analysis model 104 to be trained (or retrained) based on the image, the exterior accessibility score, and the validation information.

By using the building analysis model, the service qualification platform may identify a unit with exterior access to a multi-unit building (e.g., a unit that is a good candidate for 5G wireless network service) and a unit with no exterior access to the multi-unit building (e.g., a unit that is a poor candidate for 5G wireless network service). By identifying a unit with no exterior access, the service qualification platform may eliminate false positives (e.g., indicating 5G wireless network coverage) for network service qualifications for such unit that would occur when simply qualifying every unit of the multi-unit building based on the address of the multi-unit building.

By eliminating false positives, the service qualification platform may preserve computing resources (e.g., processing resources, memory resources, communication resources, and/or the like), networking resources, and/or or the like that would have been used to configure network services in a unit to which 5G wireless network services cannot be provided, attempt to correct the wireless network coverage for the unit to which 5G wireless network services cannot be provided, handle customer complaints associated with the network service, and/or the like. By eliminating false positives, the service qualification platform may enhance customer experience associated with the network service at the unit.

As indicated above, FIGS. 1A-1D are provided merely as examples. Other examples may differ from what is described with regard to FIGS. 1A-1D.

Figure 2:
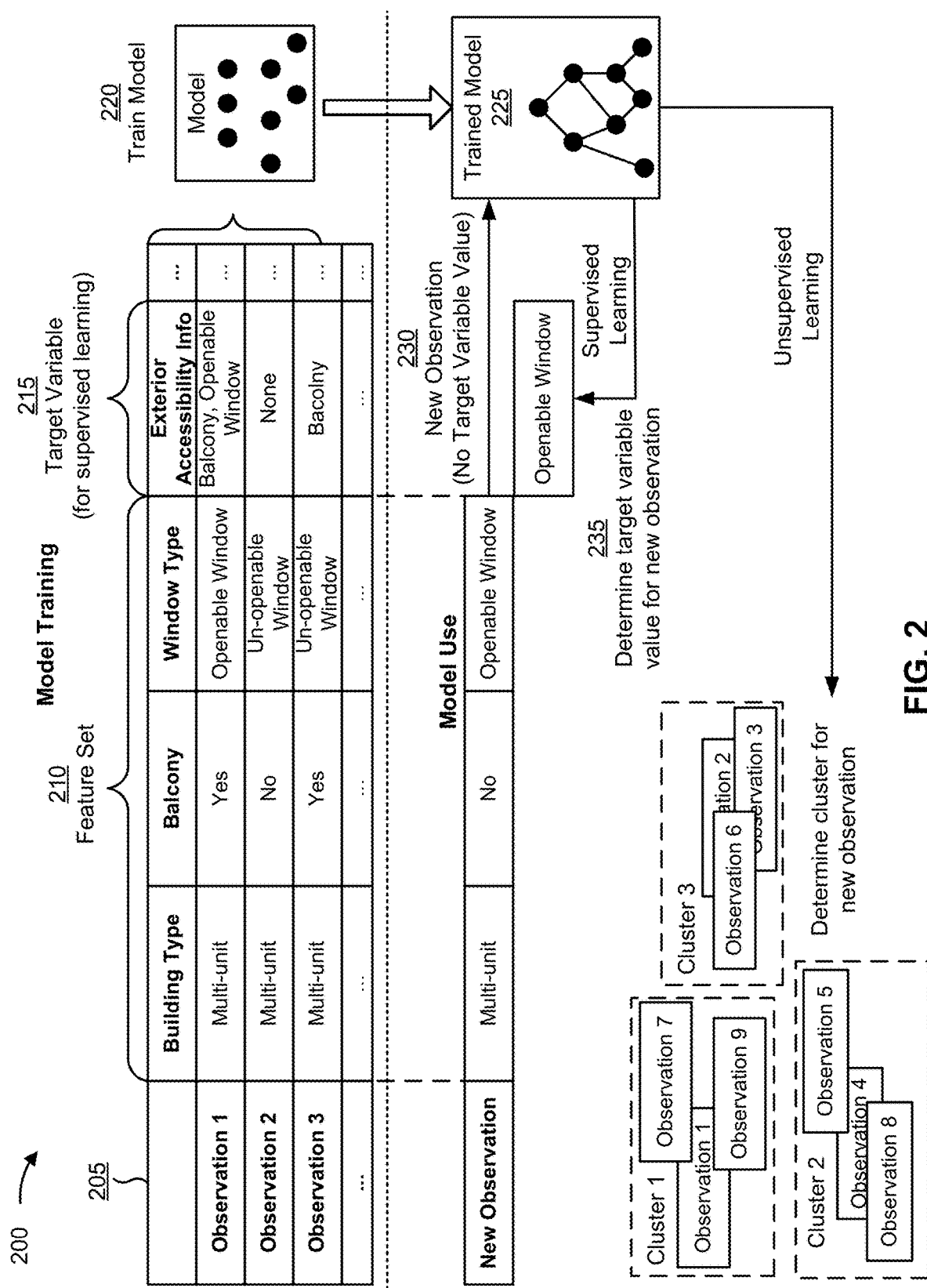
FIG. 2 is a diagram illustrating an example of training a machine learning model.

FIG. 2 is a diagram illustrating an example 200 of training and using a machine learning model in connection with identifying a service qualification of a multi-unit building based on exterior access. The machine learning model training and usage described herein may be performed using a machine learning system. The machine learning system may include or may be included in a computing device, a server, a cloud computing environment, and/or the like, such as service qualification platform 102 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from service qualification platform 102, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from service qualification platform 102. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of building type, a second feature of balcony, a third feature of window type, and so on. As shown, for a first observation, the first feature may have a value of multi-unit, the second feature may have a value of yes, the third feature may have a value of openable window, and so on. These features and feature values are provided as examples, and may differ in other examples. For example, the feature set may include one or more of the following features: patio, unopenable window, openable window, confidence score for balcony, confidence score for openable window, confidence score for unopenable window, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is exterior accessibility info, which has a value of balcony, openable window for the first observation.

The feature set and target variable described above are provided as examples, and other examples may differ from what is described above. For example, for a target variable of exterior access score, the feature set may include confidence score of detected openable window, confidence score of detected un-openable window, and confidence score of detected balcony.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of multi-unit, a second feature of no, a third feature of openable window, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of openable window for the target variable of exterior accessibility info for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, unit is qualified for service. The first automated action may include, for example, provide notification that unit is qualified for service.

As another example, if the machine learning system were to predict a value of unit is unopenable window for the target variable of exterior accessibility info, then the machine learning system may provide a second (e.g., different) recommendation (e.g., unit is not qualified for service) and/or may perform or cause performance of a second (e.g., different) automated action (e.g., provide notification that unit is not qualified for service).

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to identifying a service qualification of a multi-unit building based on exterior. The machine learning system enables recognition and/or identification of tens, hundreds, thousands, or millions of features and/or feature values for tens, hundreds, thousands, or millions of observations, thereby increasing accuracy and consistency and reducing delay associated with identifying a service qualification of a multi-unit building based on exterior relative to requiring computing resources to be allocated for tens, hundreds, or thousands of operators to manually identify a service qualification of a multi-unit building based on exterior using the features or feature values.

As indicated above, FIG. 2 is provided as an example. Other examples may differ from what is described in connection with FIG. 2.

Figure 3:
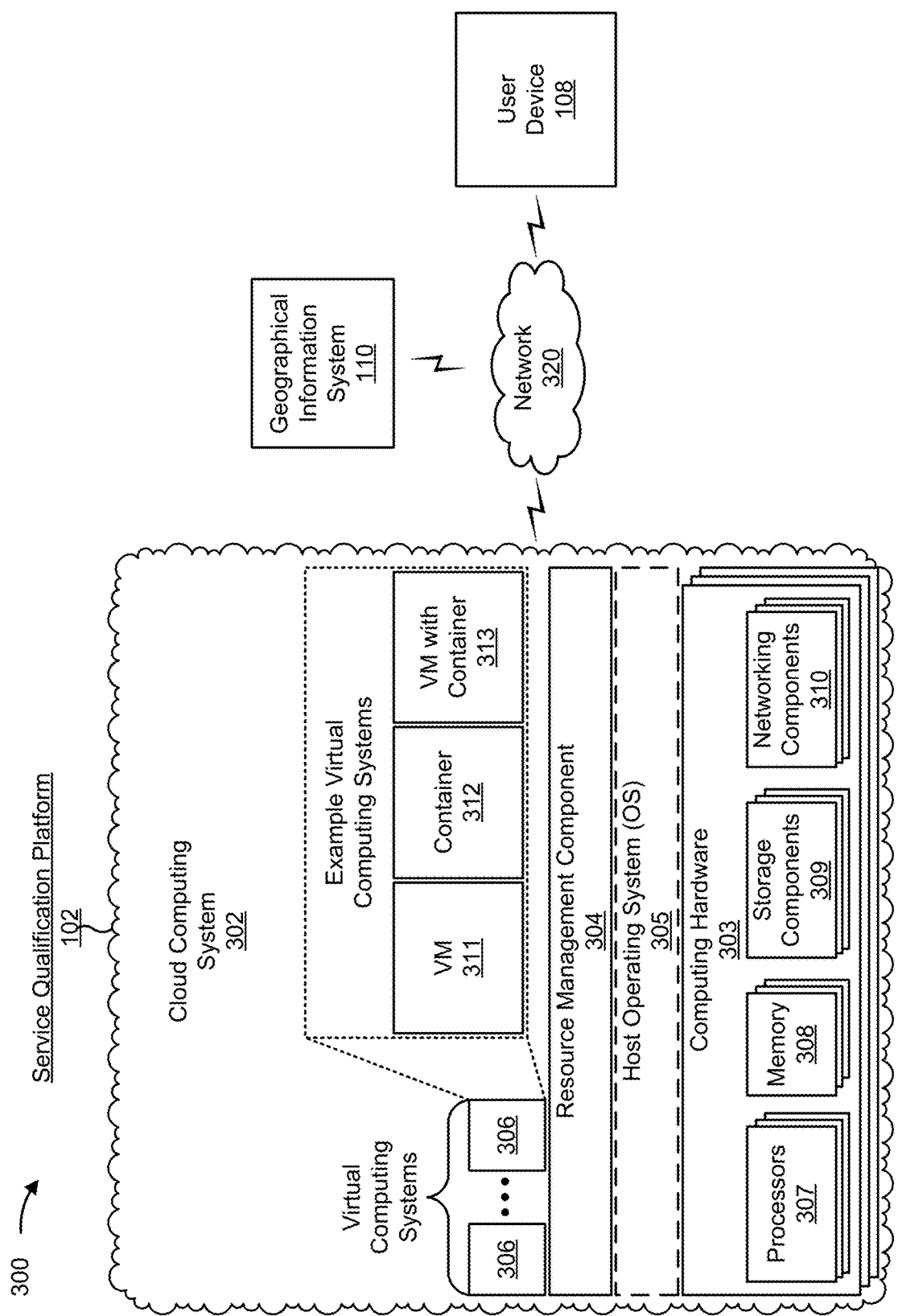
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a service qualification platform 102, which may include one or more elements of and/or may execute within a cloud computing system 302. The cloud computing system 302 may include one or more elements 303-313, as described in more detail below. As further shown in FIG. 3, environment 300 may include a user device 108, a geographical information system 110, and/or a network 320. Devices and/or elements of environment 300 may interconnect via wired connections and/or wireless connections.

User device 108 includes one or more devices capable of receiving, generating, storing, processing, and/or providing information, such as information described herein. For example, user device 108 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, user device 108 receives information from and/or transmit information to service qualification platform 102.

Geographical information system 110 includes one or more devices capable of receiving, generating, storing, processing, and/or providing geographical information regarding geographical areas. The geographical information may include geographical coordinates (e.g., latitudes and longitudes). As an example, the geographical information system 110 may provide virtual maps regarding geographical areas. In some implementations, geographical information system may receive requests for images of multi-unit buildings from service qualification platform 102 and transmit the images of the multi-unit buildings to service qualification platform 102, as described above.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the service qualification platform 102 may include one or more elements 303-313 of the cloud computing system 302, may execute within the cloud computing system 302, and/or may be hosted within the cloud computing system 302, in some implementations, the service qualification platform 102 may not be cloud-based (e.g., may be implemented outside of a cloud computing system) or may be partially cloud-based. For example, the service qualification platform 102 may include one or more devices that are not part of the cloud computing system 302, such as device 400 of FIG. 4, which may include a standalone server or another type of computing device. The service qualification platform 102 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
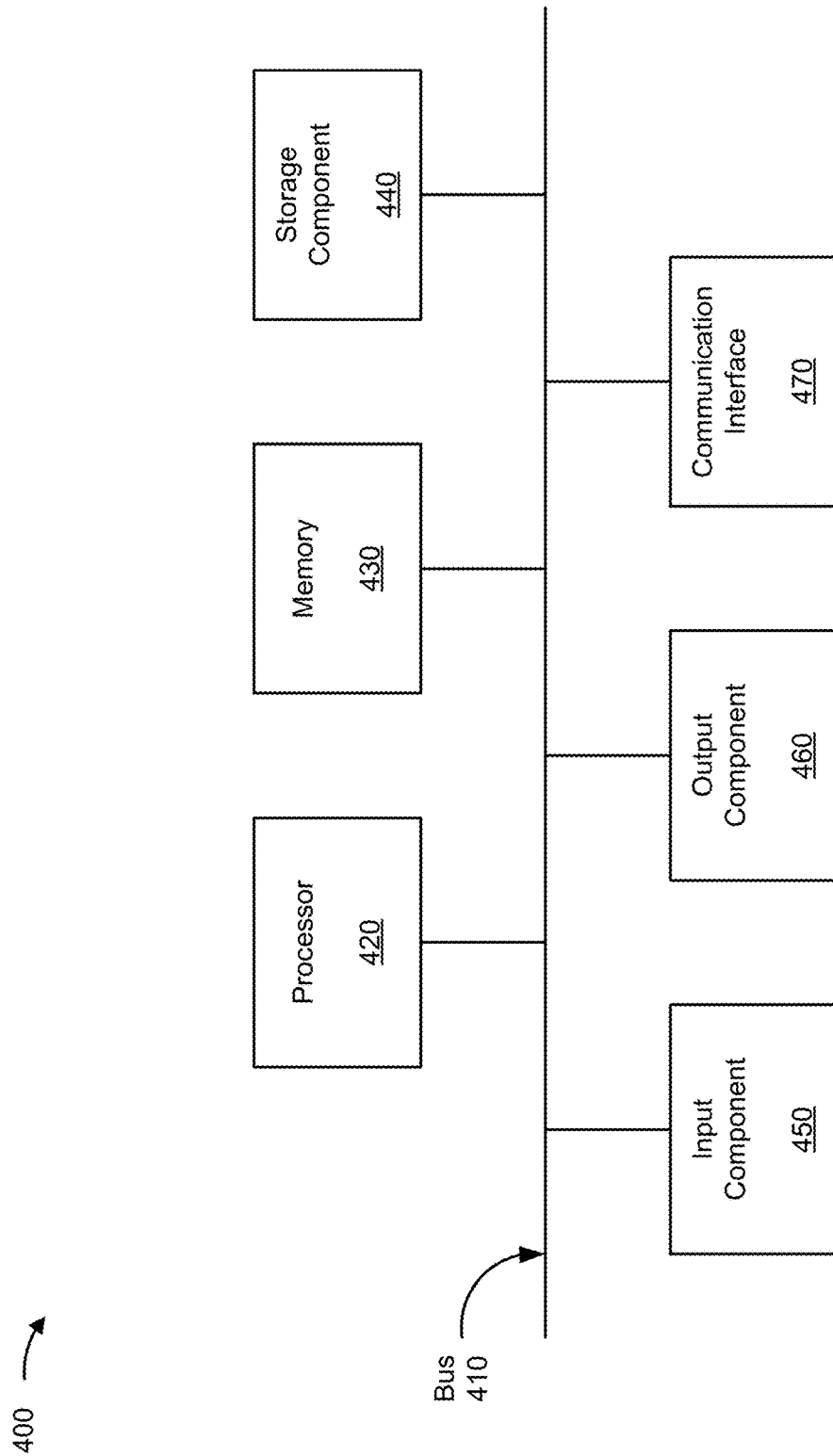
FIG. 4 is a diagram of example components of one or more devices of FIG. 3.

FIG. 4 is a diagram of example components of one or more devices 400 of FIG. 3. Device 400 may correspond to Service qualification platform 102, user device 108, and/or geographical information system 110. In some implementations, Service qualification platform 102, user device 108, and/or geographical information system 110 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
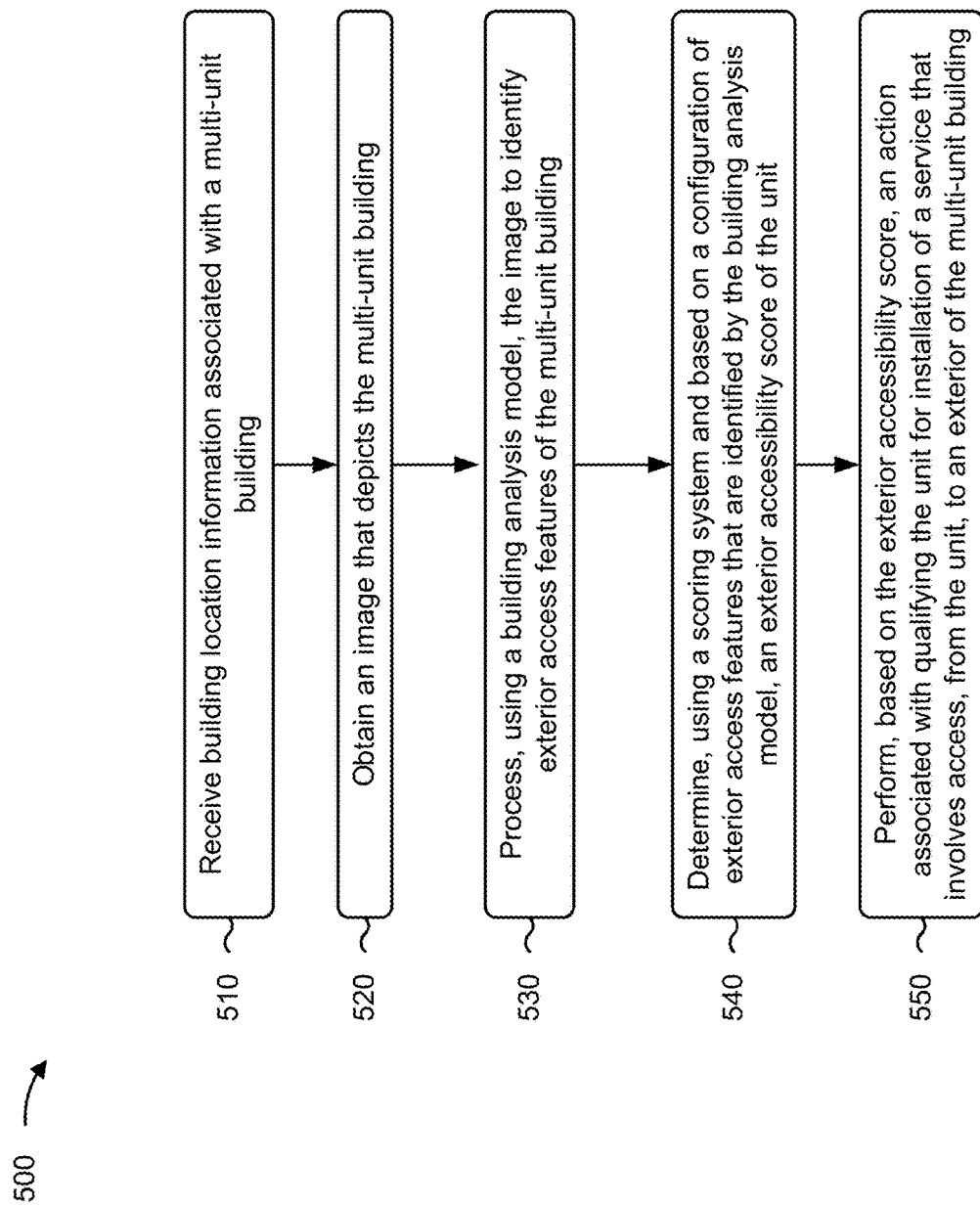
FIG. 5 is a flow chart of an example process relating to identifying a service qualification of a multi-unit building based on exterior access.

FIG. 5 is a flow chart of an example process 500 associated with systems and methods for identifying a service qualification of a multi-unit building based on exterior. In some implementations, one or more process blocks of FIG. 5 may be performed by a service qualification platform (e.g., service qualification platform 102). In some implementations, one or more process blocks of FIG. 5 may be performed by another device or a group of devices separate from or including the device, such as a user device (e.g., user device 108), a geographical information system (e.g., geographical information system 110), and/or the like, and/or the like. Additionally, or alternatively, one or more process blocks of FIG. 5 may be performed by one or more components of a device 400, such as processor 420, memory 430, storage component 440, input component 450, output component 460, communication component 470, and/or the like.

As shown in FIG. 5, process 500 may include receiving building location information associated with a multi-unit building (block 510). For example, the device may receive building location information associated with a multi-unit building, as described above. The building location information includes at least one of: an address of the multi-unit building; a street associated with the multi-unit building; or geographical coordinates of the multi-unit building. The building location information includes an address of the multi-unit building and the image is associated with a street view of the multi-unit building from a geographical location that is mapped to the address by the geographical information system.

As further shown in FIG. 5, process 500 may include obtaining an image that depicts the multi-unit building (block 520). For example, the device may obtain an image that depicts the multi-unit building, as described above. In a first implementation, obtaining the image includes providing, to a geographical information system, a request for a street view of the multi-unit building; and receiving, from the geographical information system, the image from the geographical information system. The request may include the building location information. The image may include a street view image that depicts the building from a geographical location identified in the building location information. The image may include a street view image of the multi-unit building and the plurality of historical images include historical street view images of other multi-unit buildings that had the other exterior access features.

Prior to using the geographical information system to obtain the image, process 500 may include determining, based on unit location information associated with the unit, that the facade is associated with the unit, wherein the image is obtained based on determining that the facade is associated with the unit.

As further shown in FIG. 5, process 500 may include processing, using a building analysis model, the image to identify exterior access features of the multi-unit building (block 530). For example, the device may process, using a building analysis model, the image to identify exterior access features of the multi-unit building, as described above. In some implementations, the building analysis model is trained based on a plurality of historical images of other exterior access features.

The building analysis model may include a computer vision model that is configured to identify individual exterior access features of the multi-unit building based on at least one of: detecting a particular shape depicted in the image that corresponds to an openable window, or detecting a particular shape depicted in the image that corresponds to a balcony.

As further shown in FIG. 5, process 500 may include determining, using a scoring system and based on a configuration of exterior access features that are identified by the building analysis model, an exterior accessibility score of the unit (block 540). For example, the device may determine, using a scoring system and based on a configuration of exterior access features that are identified by the building analysis model, an exterior accessibility score of the unit, as described above. The exterior accessibility score may correspond to a probability that the unit enables access to an exterior of the multi-unit building. The exterior accessibility score may correspond to a degree of access, from the unit, to an exterior of the multi-unit building. The configuration of the identified exterior access features may be associated with at least one of: a quantity of the identified exterior access features on the multi-unit building; types of the identified exterior access features on the multi-unit building; or a percentage of the multi-unit building that is determined to be associated with the identified exterior access features.

The configuration of the identified exterior access features may be associated with at least one of: a quantity of the identified exterior access features on the facade of the multi-unit building; types of the identified exterior access features identified on the facade of the multi-unit building; or a percentage of a surface area of the facade that is associated with the identified exterior access features.

The exterior accessibility score may be determined using a scoring system. The scoring system may be configured to: determine a first probability that a unit of the multi-unit building has access to an exterior of the multi-unit building via an openable window; determine a second probability that the unit of the multi-unit building has access to the exterior of the multi-unit building via a balcony; and determine the exterior accessibility score based on first probability and the second probability.

As further shown in FIG. 5, process 500 may include performing, based on the exterior accessibility score, an action associated with qualifying the unit for installation of a service that involves access, from the unit, to an exterior of the multi-unit building (block 550). For example, the device may perform, based on the exterior accessibility score, an action associated with qualifying the unit for installation of a service that involves access, from the unit, to an exterior of the multi-unit building, as described above. In a second implementation, alone or in combination with the first implementation, performing the action may include qualifying the multi-unit building for the installation of the service based on the exterior accessibility score satisfying a threshold for providing the service; causing an offer for the service to be generated in association with the installation of the service within the unit; providing, to a service representative device, a notification that the multi-unit building is qualified for the service based on the exterior accessibility score satisfying the threshold; causing a modification to a wireless network to provide coverage of the service to the multi-unit building based on the exterior accessibility score satisfying the threshold; or updating a service coverage mapping to include the building location information to indicate that the unit or the multi-unit building is qualified for the service.

In a third implementation, alone or in combination with one or more of the first and second implementations, performing the action may include qualifying the multi-unit building for the service based on the service qualification metric satisfying a threshold for providing the service; causing an offer for the service to be generated in association with setting up the service within one or more units of the multi-unit building; providing, to a user device that provided a service request that included the building location information, a notification that the multi-unit building is qualified for the service; or updating a service coverage mapping to include the building location information to indicate that the unit or the multi-unit building is qualified for the service.

The service qualification metric may be determined based on the exterior accessibility score and a service coverage metric associated with an availability of the service at a geographical location associated with the building location information. The image may be associated with a street view of the multi-unit building from the geographical location.

In a fourth implementation, alone or in combination with one or more of the first through third implementations, process 500 includes receiving validation information associated with the exterior accessibility score; and retraining the building analysis model based on the image, the exterior accessibility score, and the validation information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   processing, by a device and using a model, an image to identify exterior access features of a multi-unit building;
   determining, by the device and based on identifying the exterior access features, an exterior accessibility score of a unit of the multi-unit building;
   determining, by the device and based on the exterior accessibility score, a service qualification metric for the unit that is associated with a capability of receiving service within the unit; and
   performing, by the device, an action associated with the service qualification metric.

2. The method of claim 1, further comprising:
   prior to processing the image, determining that a geographical information system is unable to obtain another image depicting a street view of a facade of the multi-unit building; and
   obtaining the image,
       wherein the image comprises a satellite image of a face of the multi-unit building.

3. The method of claim 1, wherein processing the image comprises:
   utilizing an object detection algorithm to identify one or more bounding boxes for the exterior access features.

4. The method of claim 1, wherein the exterior accessibility score corresponds to a degree of access, from the unit, to an exterior of the multi-unit building.

5. The method of claim 1, wherein the exterior accessibility score is associated with one or more of:
   a quantity of the exterior access features on a facade of the multi-unit building,
   types of the exterior access features on the facade of the multi-unit building, or
   a portion of a surface area of the facade of the multi-unit building.

6. The method of claim 1, wherein the model is trained based on historical images of multi-unit buildings.

7. The method of claim 1, wherein the model is trained based on performing object detection on historical images of multi-unit buildings.

8. A non-transitory computer-readable medium storing a set of instructions, the set of instructions comprising:
   one or more instructions that, when executed by one or more processors of a device, cause the device to:
       process, using a model, an image to identify exterior access features of a multi-unit building;
       determine, based on identifying the exterior access features, an exterior accessibility score of a unit of the multi-unit building;
       determine, based on the exterior accessibility score, a service qualification metric for the unit that is associated with a capability of receiving service within the unit; and
       perform an action associated with the service qualification metric.

9. The non-transitory computer-readable medium of claim 8, wherein the model includes a computer vision model that is configured to identify individual exterior access features of the exterior access features based on detecting a particular shape depicted in the image.

10. The non-transitory computer-readable medium of claim 8, wherein the one or more instructions, that cause the device to process the image, cause the device to:
   determine a measure of confidence of object detection of the exterior access features.

11. The non-transitory computer-readable medium of claim 8, wherein the model is trained to identify non-openable exterior access features.

12. The non-transitory computer-readable medium of claim 8, wherein the image depicts a street view of the multi-unit building.

13. The non-transitory computer-readable medium of claim 8, wherein the one or more instructions further cause the device to:
- obtain a layout of the multi-unit building from a data structure;
- determine a location of a unit based on the layout; and
- provide information to a geographical information system to cause the geographical information system to obtain the image,
  - wherein the image depicts a facade that includes the unit.

14. The non-transitory computer-readable medium of claim 8, wherein the one or more instructions further cause the device to:
- obtain information identifying a unit in the multi-unit building; and
- identify the image from a plurality of images based on the image corresponding to a location of the unit.

15. A device, comprising:
one or more processors configured to:
- process, using a model, an image to identify exterior access features of a multi-unit building;
- determine, based on identifying the exterior access features, an exterior accessibility score of a unit of the multi-unit building;
- determine, based on the exterior accessibility score, a service qualification metric for the unit that is associated with a capability of receiving service within the unit; and
- perform an action associated with the service qualification metric.

16. The device of claim 15, wherein the model is trained based on a Common Objects in Context dataset.

17. The device of claim 15, wherein the one or more processors, to process the image, are configured to:
- use one or more deep neural network algorithms to identify the exterior access features.

18. The device of claim 15, wherein the exterior accessibility score is based on a measure of confidence associated with a probability that the exterior access features enable access to an exterior of the multi-unit building.

19. The device of claim 15, wherein the exterior accessibility score is associated with a configuration of the exterior access features.

20. The device of claim 15, wherein the service qualification metric includes a value that indicates a predicted signal quality of the service at the multi-unit building.

* * * * *